United States Patent
Clerc et al.

(10) Patent No.: US 6,782,757 B2
(45) Date of Patent: Aug. 31, 2004

(54) MEMBRANE PRESSURE SENSOR CONTAINING SILICON CARBIDE AND METHOD OF MANUFACTURE

(75) Inventors: Jean-Fréderic Clerc, Le Fontanil (FR); Claude Jaussaud, Meylan (FR); Jean-Pierre Joly, Saint Egreve (FR); Jean Therme, Herbeys (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/685,526

(22) Filed: Oct. 16, 2003

(65) Prior Publication Data

US 2004/0079163 A1 Apr. 29, 2004

Related U.S. Application Data

(62) Division of application No. 09/831,911, filed as application No. PCT/FR99/02911 on Nov. 25, 1999, now Pat. No. 6,688,181.

(30) Foreign Application Priority Data

Nov. 27, 1998 (FR) .............................. 98 14968

(51) Int. Cl.⁷ ................................. G01L 9/16
(52) U.S. Cl. ....................................... 73/754
(58) Field of Search .................. 73/715–727, 753–756; 29/25.35

(56) References Cited

U.S. PATENT DOCUMENTS 4,706,100 A 11/1987 Tufte
4,894,635 A 1/1990 Yajima et al.
4,898,035 A 2/1990 Yajima et al.
5,095,401 A 3/1992 Zavracky et al.

FOREIGN PATENT DOCUMENTS

DE 196 01 791 7/1997
FR 2 681 472 3/1993

*Primary Examiner*—William Oen
(74) *Attorney, Agent, or Firm*—Oblon, Spivak, McClelland, Maier & Neustadt, P.C.

(57) ABSTRACT

The invention concerns a pressure sensor (1), able to operate at high temperature and measure the pressure of a hostile medium, comprising:

Figure 1:
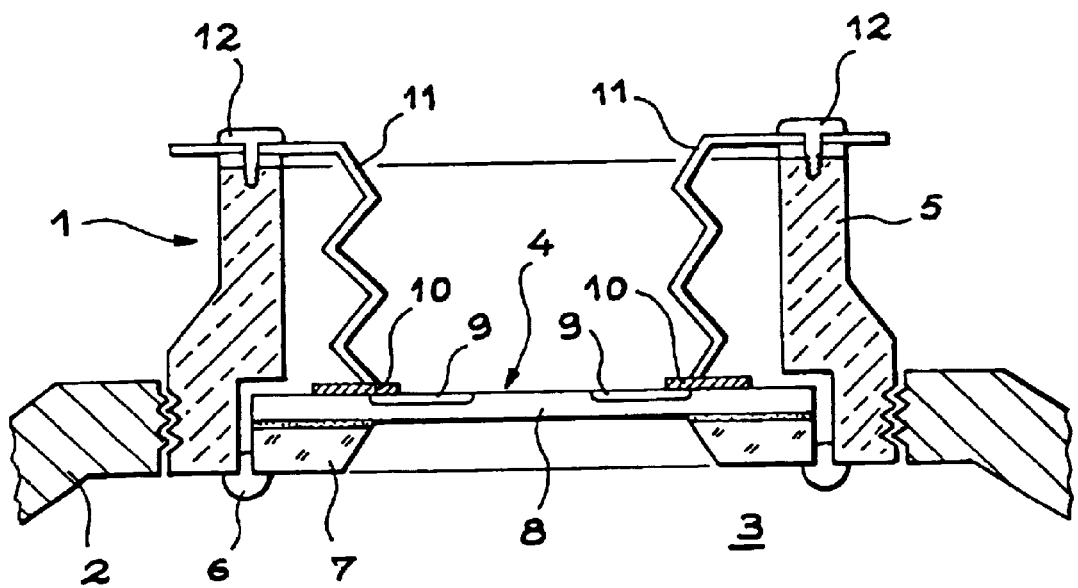

a sensing element (4) integrating a membrane (8) in monocrystalline silicon carbide, made by micromachining a substrate in polycrystalline silicon carbide, a first surface of membrane (8) intended to contact said medium, a second surface of membrane (8) comprising membrane deformation detection means (9) connected to electric contacts (10) to connect electric connection means (11), the surfaces of sensing element (4) contacting said medium being chemically inert to this medium;

a carrier (5) to support sensing element (4) so that said first surface of membrane (8) may be contacted with said medium and the second surface of membrane (8) may be shielded from said medium, carrier (5) being in polycrystalline silicon carbide;

a seal strip (6), in material containing silicon carbide, brazed between carrier (5) and sensing element (4) to protect the second surface of membrane (8) from any contact with said medium.

26 Claims, 4 Drawing Sheets

MEMBRANE PRESSURE SENSOR CONTAINING SILICON CARBIDE AND METHOD OF MANUFACTURE

This application is a Divisional of application Ser. No. 09/831,911 filed on May 25, 2001 now U.S. Pat. No. 6,688,181, which is a National Stage of PCT/FR99/02911 filed Nov. 25, 1999.

TECHNICAL FIELD

The present invention relates to a membrane pressure sensor containing silicon carbide. It also concerns the manufacture of the sensing element of the sensor.

PRIOR ART

With micro-electronic techniques it is possible to produce miniature pressure sensors using collective manufacturing processes. Small-sized sensors can therefore be produced at low cost. They provide the possibility of producing a sensor and its associated electronics on one same carrier.

Micro-machined pressure sensors are known, made up of a silicon membrane a few tenths of a μm in thickness. The difference in pressure between the two surfaces of the membrane may be detected by measuring the recess stresses by means of piezoresistive gauges obtained by ion diffusion or implantation. These piezoelectric gauges have high sensitivity and extensive mechanical stability due to the monocrystalline structure of the silicon used. Between each gauge and the substrate on which they are fabricated, electric insulation is achieved using reverse junctions. This has the disadvantage of limiting the range of operating temperature of these sensors to a maximum of 125° C., due to the strong leakage current at the reverse junction, and of causing a high noise level (thermal noise and piezoelectric junction noise) which reduces the dynamic range. A further disadvantage of piezoresistive gauges for their usual use results from the direct exposure of these gauges and from metallisation related to the fluid whose pressure is to be measured, which submits these elements to the effects of humidity and corrosive agents.

Pressure sensors are also known with piezoresistive gauges embedded in the silicon. However, these sensors cannot be used for temperatures over 200° C.

Pressure sensors made on SOI (Silicon-On-Insulator) substrates are also known. These sensors do not have the disadvantages due to leakage current or to noise on account of the intermediate insulating layer. They may be used up to temperatures in the order of 400° C.

Research is currently focusing on techniques using silicon carbide, which are able to provide products able to operate up to temperatures in the order of 700° C.

These micro-machined pressure sensors are encapsulated in relation to their intended use. Pressure sensors for the automotive industry and those intended to be mounted on a board are generally encapsulated in pre-moulded "dual-in-line" type casings. Some casings may be custom-made in relation to the intended application, by designing a pre-moulded housing in thermoplastic material to ensure the best possible mechanical integration of the sensor, and by using the "dual chip" technique for the incorporation of associated electronics. In practice, this type of encapsulation offers very few application possibilities and the presence of thermoplastic material imposes a maximum temperature.

The use of pressure sensors in a hostile environment requires giving consideration to the restraints of temperature, and the type of fluid whose pressure it is sought to measure, in particular its corrosive nature. So as to protect the membrane of the sensor from its immediate environment, encapsulation frequently integrates means for the hydraulic transmission of the pressure to be measured, combining for example silicon oil and a membrane or a metal bellow device. This solution has the disadvantage of increasing the cost of the sensor. Also, silicon oil does not withstand a temperature greater than 300° C. For higher temperatures, mercury may be used, but regard must be given to its harmful effect on the environment.

In a hostile medium, encapsulation may further use materials such as stainless steel and ceramic in order to protect the silicon part of the sensor. The sensor membrane may be protected from the medium, whose pressure is to be measured, by another membrane which directly covers the first membrane (enabling operation of the sensor up to 300° C.) or by a mechanical pressure transmission system using a diaphragm (which enables operation of the sensor up to 450° C.).

U.S. Pat. No. 4,898,035 discloses a ceramic pressure sensor, for the measurement in particular of the pressure in the cylinder of an internal combustion engine. This sensor comprises a sensing element integrating a membrane, a first surface of the membrane being intended to contact the medium whose pressure is to be measured. The second surface of the membrane supports membrane deformation detection means connected to electric conductors, not shown. The membrane being is ceramic, its surface intended to contact the hostile medium is chemically inert relative to this medium. The carrier of the sensing element supports this element so that one of the surfaces of the membrane is in contact with the hostile medium and the opposite surface is shielded from this contact. The carrier and ring disk are metallic. The seal between the inside of the sensing element and its carrier is ensured by the connection layer in glass or a brazing material.

U.S. Pat. No. 4,894,635 discloses a stress sensor, for example a pressure sensor. This sensor is intended to operate at high temperature. It is also intended for use in a hostile medium such as vehicle engines. The sensing element is formed from a substrate in ceramic. It comprises a membrane of which one surface is exposed to the medium whose pressure is to be measured, and the other surface supports the detection means. Parts act as support for the sensing element. They place one of the membrane surfaces in contact with said medium and prevent the surface opposite the membrane from coming into contact with this medium. The seal is ensured by a toroidal joint.

Document DE-A-196 01 791 discloses a membrane detector and its method of manufacture. The detector is a micro-machined structure comprising a deformable membrane integral with a peripheral part enabling its deformation. The membrane comprises a layer in SiC and a layer in SiO2. The detection elements are placed on the electric insulating layer.

U.S. Pat. No. 4,706,100 discloses a piezoresistive pressure sensor comprising: a substrate of monocrystalline silicon, an epitaxied layer of monocrystalline □-SiC, piezoelectric resistances formed by diffusion or implantation in the epitaxied layer, electric contacts to connect the piezoelectric resistances and a cavity formed on the rear surface of the substrate to form a membrane.

DESCRIPTION OF THE INVENTION

The present invention was designed to remedy the disadvantages of pressure sensors of the prior art. It can be used to produce a miniature pressure sensor manufactured by collective manufacturing processes, compatible with resistance to a severe environment (high temperature, chemically aggressive measuring medium), compatible with simplified encapsulation and having a low production cost.

The subject of the invention is therefore a pressure sensor able to operate at high temperature and to measure the pressure of a hostile medium, comprising:

a sensing element integrating a membrane in monocrystalline silicon carbide and produced by micro-machining a substrate in polycrystalline silicon carbide, a first surface of the membrane being intended to be placed in contact with said medium, a second surface of the membrane comprising means to detect membrane deformation connected to electric contacts for connection of the electric connection means, the surfaces of the sensing element intended to be in contact with said medium being chemically inert relative to this medium;

a carrier supporting the sensing element so that said first surface of the membrane may be contacted with said medium and the second surface of the membrane may be shielded from contact with said medium, the carrier being in polycrystalline silicon carbide;

a seal strip in material containing silicon carbide brazed between the carrier and the sensing element to protect the second surface of the membrane against any contact with said medium.

If the sensor is intended to measure absolute pressure, the carrier may comprise a sealed closing part so that a vacuum can be set up inside the carrier.

Advantageously, the carrier is tube-shaped, the sensing element closing one of the tube ends, the first surface of the membrane being directed towards the outside of the tube. It may then be provided with a thread with which it can be screwed onto a reservoir containing the medium.

An insulating interface layer may be provided between the membrane and the substrate part of the sensing element. This insulating interface layer may be in a material chosen from among silicon oxide, silicon nitride and carbon-containing silicon.

The electric contacts equipping the detection means may be in a silicide containing tungsten. The connection between the electric contacts and the electric connection means may be obtained by a solder material withstanding high temperatures. This solder material may be a silicide containing tungsten. Conductor means may also be provided forming a spring to ensure the connection between the electric contacts and the electric connection means.

The detection means may comprise at least two piezoresistive gauges, in monocrystalline silicon carbide for example.

A further subject of the invention is a method of manufacture by micro-machining at least one membrane sensing element for a pressure sensor able to operate at high temperature and to measure the pressure of a hostile medium, comprising the following steps:

a) producing a layer of monocrystalline silicon carbide on one surface of a substrate containing polycrystalline silicon carbide, b) fabricating, on the free surface of the monocrystalline silicone carbide layer, means to detect membrane deformation, c) fabricating electric contacts on said free surface to connect the detection means to the electric connection means, d) forming the membrane of said sensing element by removing material from the other surface of the substrate, so as only to preserve polycrystalline silicon carbide.

The fabrication of said layer of monocrystalline silicon carbide may comprise:

transferring a first layer of monocrystalline silicon carbide onto said surface of the substrate, depositing by epitaxy a second layer of monocrystalline silicone carbide on the first layer in order to obtain said monocrystalline silicon carbide layer of controlled thickness.

The production of said layer of monocrystalline silicon carbide may entail the use of a wafer in monocrystalline silicon carbide in which a layer has been defined by a layer of microcavities generated by depositing by epitaxy a second layer of monocrystalline silicone carbide on the first layer in order to obtain said monocrystalline silicon carbide layer of controlled thickness.

The production of said layer of monocrystalline silicon carbide may entail the use of a wafer in monocrystalline silicon carbide in which a layer has been defined by a layer of microcavities generated by ion implantation, said wafer being bonded to said surface of the substrate and then cleaved at the layer of microcavities so as only to preserve said layer defined on the substrate. Preferably, cleavage of the wafer is obtained by coalescence of the microcavities resulting from heat treatment. Also preferably, the bonding of said wafer onto the substrate is obtained by molecular bonding.

Before the step to produce said layer of monocrystalline silicon carbide, an insulating interface layer may be deposited on the surface of the substrate on which said layer is to be made.

During the membrane formation step, the removal of matter from the other surface of the substrate may be conducted using an operation chosen from among mechanical machining and chemical etching.

According to one variant of embodiment, the method may comprise the following preliminary steps:

machining a substrate to obtain a bump of complementary shape to the shape of the desired sensing element as seen from the hostile medium side, depositing a layer of polycrystalline silicon carbide on the substrate on the bumping side, levelling the previously deposited layer down as far as the tip of the bump, steps a) and d) then being conducted in the following manner:

a) the layer of monocrystalline silicon carbide is formed on the substrate on the levelled layer side, the membrane of said sensing element is formed by removal of the initial substrate.

The layer of chemically inert material deposited on the substrate on the bumping side must be sufficiently thick to ensure good mechanical resistance when the initial substrate is removed.

The substrate may be in silicon.

The fabrication of said layer of monocrystalline silicon carbide may comprise:

transferring a first layer of monocrystalline silicon carbide onto the substrate, depositing by epitaxy a second layer of monocrystalline silicon carbide on the first layer of monocrystalline silicon carbide in order to obtain said monocrystalline silicon carbide layer of controlled thickness.

Advantageously, the depositing step of a layer of polycrystalline silicon carbide may be made by CVD for example. The levelling step may be conducted by mechanical-chemical polishing.

According to this variant of the method, the production of said layer of monocrystalline silicon carbide comprises the use of a wafer in monocrystalline silicon carbide in which a layer has been defined by a layer of microcavities generated by ion implantation, said wafer being bonded to the substrate on the side of the levelled layer then cleaved at the layer of microcavities so as only to preserve said layer defined on the substrate. Preferably, cleavage of the wafer is obtained by coalescence of the microcavities resulting from a heat treatment. Also preferably, the bonding of said wafer to the substrate is obtained by molecular bonding.

Before the step to produce said layer of monocrystalline silicon carbide, an insulating interface layer may be deposited on the surface of the substrate on which said first layer is to be formed.

During the membrane formation step, the removal of the initial substrate may be obtained by chemical etching.

According to another variant of embodiment, the method may comprise the following preliminary steps:

machining a substrate to obtain a bump of complementary shape to the shape of the desired sensing element as seen from the hostile medium side, depositing a layer of polycrystalline silicon carbide on the substrate on the bumping side, levelling the previously deposited layer so that above the bumping only the desired membrane thickness subsists, steps a) and d) then being conducted in the following manner:
  a) the layer of monocrystalline silicon carbide is formed on said levelled layer,
  d) the membrane of said sensing element is formed by removal of the initial substrate.

The substrate may be in silicon.

Advantageously, the depositing step of a layer of polycrystalline silicon carbide may be made by CVD for example. The levelling step may be conducted by mechanical-chemical polishing.

According to this other variant of embodiment, the fabrication of the layer of monocrystalline silicon carbide may be obtained using a wafer in monocrystalline silicon carbide in which said layer has been defined by a layer of microcavities generated by ion implantation, said wafer being bonded to the substrate on the side of the levelled layer then cleaved at the layer of microcavities so as only to preserve the layer of monocrystalline silicon carbide on the substrate. Preferably, cleavage of the wafer is obtained by coalescence of the microcavities resulting from a heat treatment. Also preferably, the bonding of said wafer to the substrate is obtained by molecular bonding.

During the membrane formation step, the removal of the initial substrate of silicon may be obtained by chemical etching.

An insulating interface layer may be deposited on the levelled layer before placing said layer of monocrystalline silicon carbide. During the forming of the detection means, the remaining part of the monocrystalline silicon carbide layer may be removed.

If the method of the invention is a collective method for fabricating sensing elements from one same substrate, a final substrate cutting step may be provided to obtain separate sensing elements.

SHORT DESCRIPTION OF THE DRAWINGS

Figure 2:
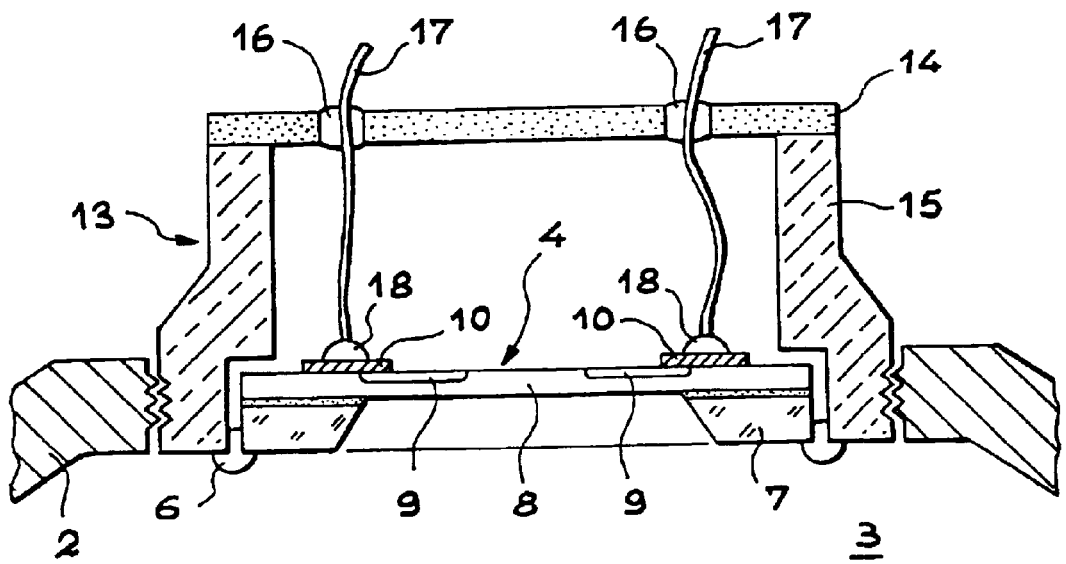
Figure 3A:
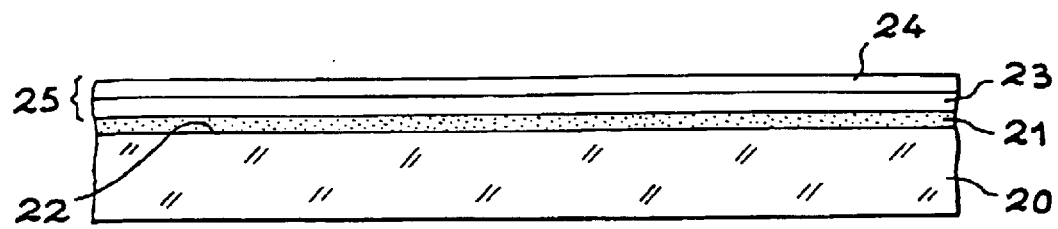
Figure 3B:
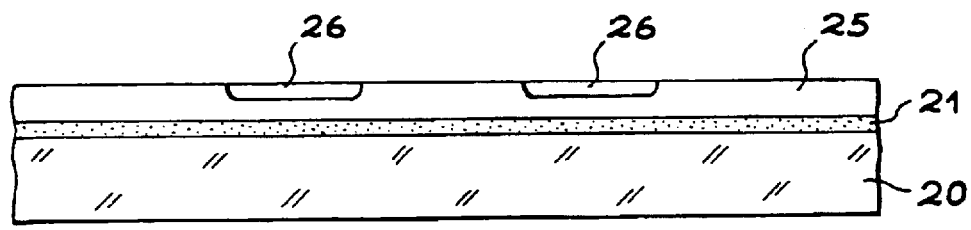
Figure 3C:
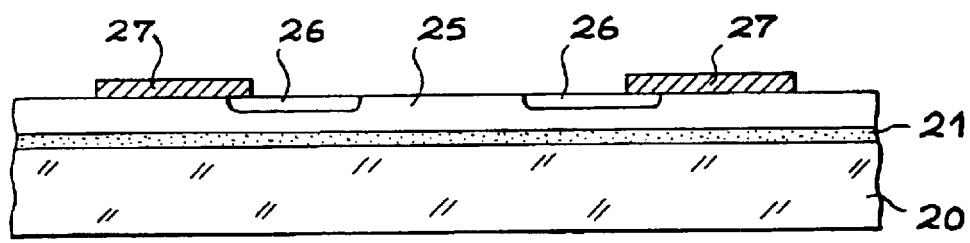
Figure 3D:
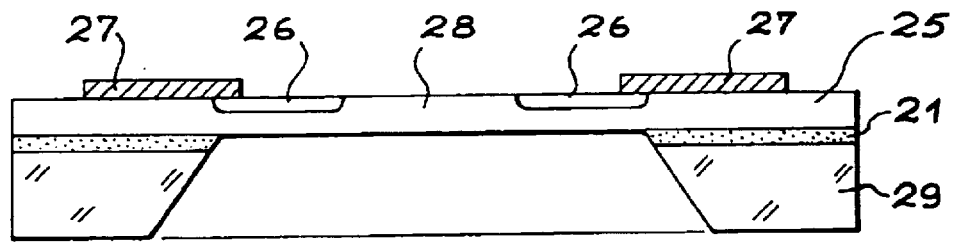
Figure 4:
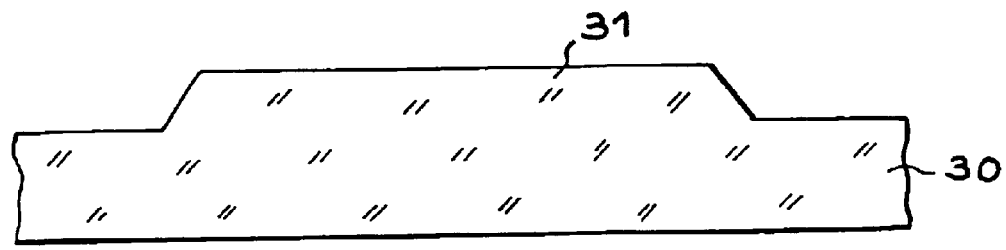
Figure 4:
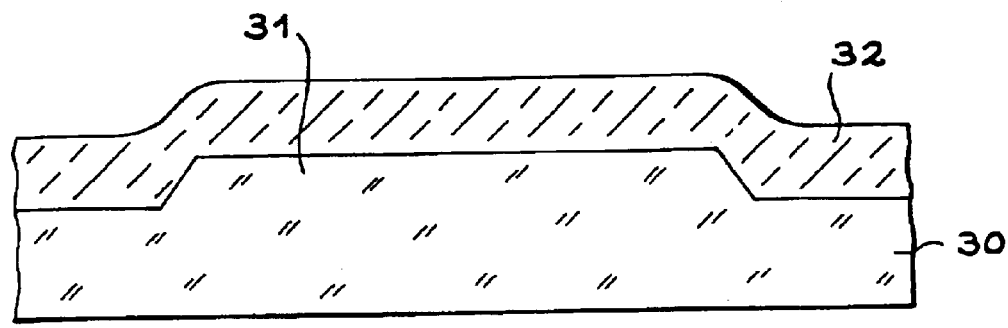
Figure 4:
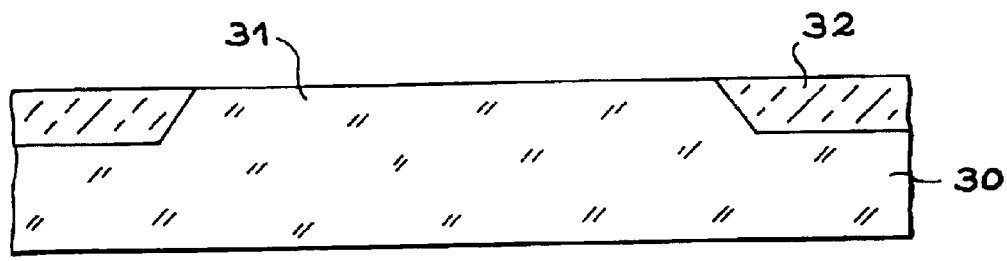
Figure 4:
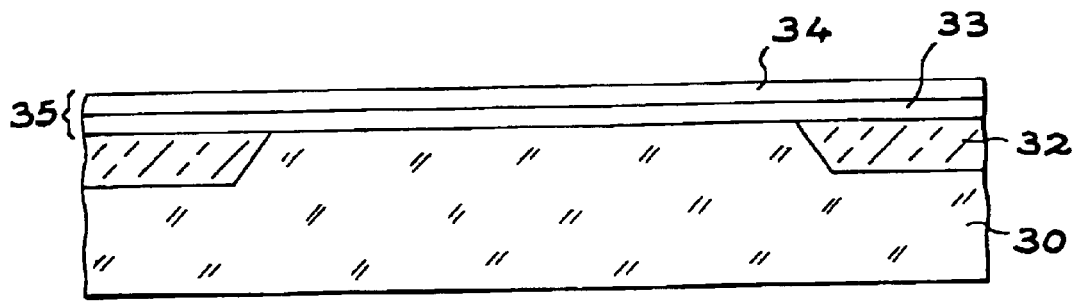
Figure 4:
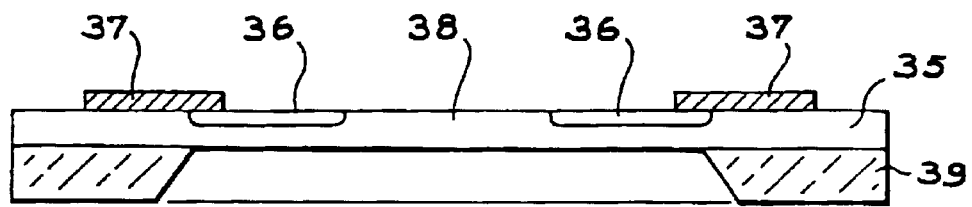
Figure 5:
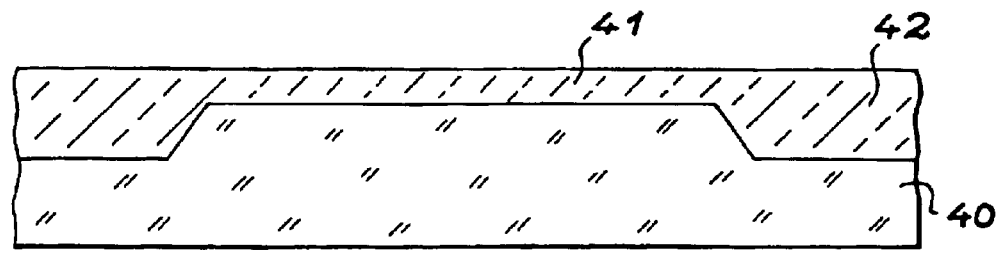
Figure 5:
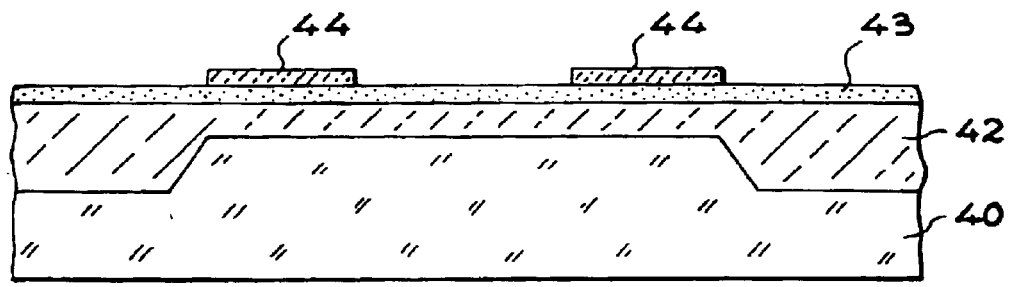
Figure 5:
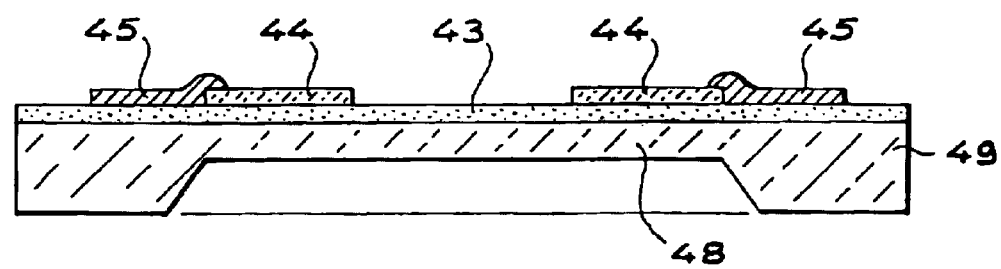

The invention will be better understood and other advantages and distinctive characteristics will become better apparent on reading the following description given as an illustrative example and therefore non-restrictive, accompanied by the appended drawings in which:

FIG. 1 is an axial section view of a membrane pressure sensor, of relative pressure type, according to the present invention, FIG. 2 is an axial section view of a membrane pressure sensor, of absolute pressure type, according to the present invention, FIGS. 3A to 3D illustrate a first embodiment method for the sensing elements of pressure sensors according to the present invention, FIGS. 4A to 4E illustrate a second embodiment method for the sensing elements of pressure sensors according to the present invention, FIGS. 5A to 5C illustrate a third embodiment method for the sensing elements of pressure sensors according to the present invention.

DETAILED DESCRIPTION OF EMBODIMENTS OF THE INVENTION

FIG. 1 shows a pressure sensor 1, according to the invention, mounted on an orifice opening into wall 2 of a reservoir (it may be an engine cylinder). The inside 3 of the reservoir contains a hostile medium whose pressure is to be measured. The pressure sensor 1 comprises a sensing element 4 fixed to one end of a carrier 5 by means of a seal strip 6.

The carrier 5, in this example of embodiment, is tubular shaped. With this shape it can be easily fixed, by screwing, into an appropriate housing in wall 2 of the reservoir. The sensing element 4 is fixed peripherally to the end of carrier 5 located on the reservoir side. The surface of the sensing element positioned towards the inside of the reservoir 2 is therefore subjected to the inner pressure of the reservoir, and the opposite surface of the sensing element is subjected to outside pressure.

The sensing element 4 comprises a thicker peripheral part 7 and a thinner central part or membrane 8. The sensing element, depending upon the range of pressure to be measured, is designed so that the peripheral part 7 does not undergo any or scarcely any deformation, while the central part or membrane 8 will undergo deformation. Membrane deformation is detected by detection means 9, by piezoresistive gauges for example positioned on the surface of membrane 8 that is not exposed to the hostile medium. The sensing element 4 also comprises, on its surface not exposed to the hostile medium, electric contacts 10 ensuring the connection between the piezoresistive gauges and an electronic circuit processing the signals given by the gauges.

This electric connection must be made taking into account the high temperature to which the pressure sensor may be submitted. As shown in FIG. 1, it is possible to use a metal wire exerting a pressure on the electric contact. Therefore wires 11, maintained by ceramic screws 12 on carrier 5, enable electrical connection with contacts 10 through a spring effect. It is also possible to solder the electric wires to the contacts using a solder material which withstands high temperatures, for example by using a material made up of a silicide containing tungsten.

Carrier 5 can be made from a tube of silicon carbide. The sensing element may be produced using one of the methods described in the remainder of the description. At least the piezoresistive gauges are made in monocrystalline silicon carbide.

The seal strip 6 brazed for example between the peripheral part 7 of the sensing element and carrier 5 may be made using one of the methods disclosed in documents FR-A6 749 787 (Assembly method using a thick joint of parts in SiC-containing materials by refractory brazing and thick refractory joint so obtained) or FR-A-2 748 471 (Assembly by brazing of ceramic materials containing silicon carbide). With these methods it is possible to directly braze silicon carbide parts to each other. It is then possible to produce a high temperature pressure sensor without using a casing in stainless steel/ceramic and to place the membrane of the sensing element in direct contact with the medium whose pressure is to be measured. This solution enables more precise sensors to be produced and at lower cost, since it does not involve a transfer operation on account of the casing.

The pressure sensor 13 in FIG. 2 comprises parts which are identical to parts of the sensor in FIG. 1. These parts carry the same reference numbers.

A closing part 14, in ceramic for example, is sealed to the end of carrier 15 opposite the sensing element 4. It is used to set up a vacuum inside the carrier. It comprises two sealed passages 16 used to insert, inside support 15, electric wires 17 intended to be connected to contacts 10. In this example, the connection of the electric wires 17 to contacts 10 is made by high temperature solders 18.

The sensing element may be produced collectively from an initial substrate. After completing the different steps of the embodiment method, the final substrate is cut to obtain sensing elements in the form of chips which are then mounted on their carriers.

FIGS. 3A to 3D are section views illustrating a first embodiment method for the sensing elements. For reasons of simplicity, the fabrication of only one sensing element is shown.

This first method uses as initial substrate 20 (see FIG. 3A) a so-called passive substrate, that is to say which is chemically inert relative to the medium whose pressure is to be measured. Substrate 20 is in polycrystalline silicon carbide. An insulating interface layer 21, for example in silicon oxide, was added for example by deposition on surface 22 of substrate 20. A first layer 23 of monocrystalline silicon carbide is transferred to the insulating interface layer 21. This transfer may advantageously be made using the transfer method disclosed in application FR-A-2 681 472. According to this transfer method, a wafer in monocrystalline silicon carbide is bombarded with ions (hydrogen ions for example) such as to create a layer of microcavities inside the wafer parallel to one its main surfaces. The layer of microcavities is situated at a depth corresponding to the thickness of the layer it is wished to transfer. The wafer is then bonded to substrate 20 such that the layer to be transferred is in contact with the interface layer 21. Bonding may be made using the molecular bonding method. Using a suitable heat treatment, the microcavities are caused to coalesce and the wafer is cleaved along the layer of microcavities. A layer 23 is obtained adhering to substrate 20, separated from the remainder of the wafer.

If the doping and thickness of the layer so obtained are insufficient to obtain good reading of the pressure range by the piezoresistive gauges, depositing may be made by epitaxy of a second layer 24 of monocrystalline silicon carbide so that it is possible to control the desired thickness and doping of the membrane. The two layers of monocrystalline silicon carbide in this case are denoted by the single reference 25.

As shown in FIG. 3B, piezoresistive gauges 26 are then formed at points of layer 25 determined in relation to the shape of the future membrane. These piezresistive gauges are produced using a method known to persons skilled in the art, for example by ion implantation and annealing.

On layer 25 a conductor layer is subsequently deposited (for example a silicide containing tungsten) which is then etched to form electric contacts 27 with the piezoresistive gauges 26 (see FIG. 3C).

Substrate 20 is then machined locally from its rear surface, perpendicular to the gauges, until the monocrystalline silicon carbide layer 25 is reached in order to form, for each sensing element, a membrane 28 attached to a peripheral part 29. Cross cutting of the final substrate will separate the sensing elements (see FIG. 3D).

FIGS. 4A to 4E are section views which illustrate a second method of embodiment of the sensing elements. For the same reasons as previously, only the fabrication of a single element is shown.

FIG. 4A shows a substrate 30, in silicon for example, which has been machined by chemical etching for example, so as to provide bumps 31 of blunt cone shape on its upper surface. Each bump corresponds to the formation of a sensing element. Etching using a base may be used (KOH for example) so that it is possible, from a silicon substrate of orientation 100, to machine cavities with edges oriented along planes 111 at 54°.

Then, on the upper surface of substrate 30, a layer 32 of polycrystalline silicone carbide is deposited which follows the contour of the bumped surface of substrate 30 (see FIG. 4B). Layer 32 may be deposited using a CVD technique (Chemical Vapour Deposition).

The substrate so coated is then levelled, for example by mechanical-chemical polishing to obtain the structure shown in FIG. 4C. Each bump tip is uncovered and each bump 31 is surrounded by polycrystalline silicon carbide 32.

As for the first described method, a first layer 33 of monocrystalline silicon carbide is transferred to the levelled substrate. A second layer 34 of monocrystalline silicon carbide may optionally be epitaxied onto the first layer 33. Layers 33 and 34 form layer 35 of monocrystalline silicon carbide (see FIG. 4D). The epitaxied layer 34 is used to control the thickness of the membrane.

Then, in the same manner as for the first described method, the piezoresistive gauges 36 and their electric contacts 37 are formed (see FIG. 4E). The initial substrate in silicon 30 is then removed, by chemical etching for example. Sensing elements are then obtained containing a membrane 38 attached to a peripheral part 39. Cross cutting of the final substrate will separate the sensing elements.

FIGS. 5A to 5C are cross sections illustrating a third method for the embodiment of the sensing elements. For the same reason as previously, only the fabrication of one sensing element is shown.

This third method starts in the same way as the second method. Bumps 41 of blunt cone shape are made on the upper surface of a substrate 40, in silicon for example. A layer 42 of polycrystalline silicon carbide is then deposited using a CVD technique for example and is levelled. As shown in FIG. 5A this levelling only concerns layer 42. It may be made by mechanical-chemical polishing to ensure proper control over the thickness of the polycrystalline silicon carbide positioned above the bumps 41.

Then, on layer 42, an insulating interface layer 43 (in silica for example) is deposited as shown in FIG. 5B. A layer of monocrystalline silicon carbide is transferred to the interface layer 43 using for example the transfer method disclosed in document FR-A-2 681 472 cited above. The epitaxy step of the previously described methods is not necessary. Pieozresistive gauges 44 are formed in this layer of monocrystalline silicone carbide which may be etched so that only the gauges subsist.

As shown in FIG. 5C, electric contacts 45 are made for the piezoresistive gauges 44. The initial substrate 40 in silicon is then removed, by chemical etching for example. This leads to obtaining sensing elements comprising a circular membrane 48 attached to a peripheral part 49. Cross cutting of the final substrate makes it possible to separate the sensing elements.

By applying the transfer method disclosed in document FR-A-2 681 472 to these three methods of embodiment, it is possible to produce a membrane containing monocrystalline SiC on a passive substrate of a different nature. The SiC membrane has the following intrinsic advantages: chemical inertia and resistance to aggressive chemical environments, resistance to high temperature, good mechanical resistance, good electric resistance of the gauges. The passive substrate may be chosen in relation to the intended application. For example, a substrate in polycrystalline SiC will have the same chemical and mechanical properties as the membrane and is a good choice for applications in a hostile medium.

What is claimed is:

1. Manufacturing method by micro-machining at least one membrane sensing element for a pressure sensor able to operate at high temperature and to measure the pressure of a hostile medium, comprising the following steps:
   (a) producing a layer of monocrystalline silicon carbide on one surface of a substrate containing polycrystalline silicon carbide,
   (b) fabricating, on the free surface of the monocrystalline silicon carbide layer, detection means to detect membrane deformation,
   (c) fabricating electric contracts on said free surface to connect the detection means to electric connection means,
   (d) forming the membrane of said sensing element by removal of matter from the other surface of the substrate so as only to preserve polycrystalline silicon carbide.

2. Method according to claim 1, which the fabrication of said monocrystalline silicon carbide layer comprises:
   transferring a first layer of monocrystalline silicon carbide to said surface of the substrate,
   depositing by epitaxy a second layer of monocrystalline silicon carbide on the first layer in order to obtain said monocrystalline silicon carbide layer of controlled thickness.

3. Method according to claim 1, in which the fabrication of said layer of monocrystalline silicon carbide comprises the use of a wafer in monocrystalline silicon carbide in which a layer has been defined by a layer of microcavities generated by ion implantation, said wafer being bonded to said surface of the substrate then cleaved at the layer of microcavities so as only to preserve said layer defined on the substrate.

4. Method according to claim 3, in which cleavage of the wafer is obtained by coalescence of the microcavities resulting from a heat treatment.

5. Method according to claim 3, in which the bonding of said wafer to the substrate is obtained by molecular bonding.

6. Method according to clam 1, further comprising depositing an insulating interface layer on the surface of the substrate containing polycrystalline silicon carbide prior to producing said layer of monocrystalline silicon carbide thereon.

7. Method according to claim 1, in which during the membrane formation step, the removal of matter from the other surface of the substrate is conducted using an operation chosen from among mechanical polishing and chemical etching.

8. Method according to claim 1, in which before step a) the method comprises the following preliminary steps:
   machining a substrate to obtain a bump of complementary shape to the shape of the desired sensing element as seen from the hostile medium side,
   depositing a layer of polycrytalline silicon carbide on the substrate on the bumping side,
   levelling the layer previously deposited until the tip of the bump is reached, steps a) and d) then being conducted in the following manner:
   a) the layer of monocrystalline silicon carbide is formed on the substrate on the side of the levelled layer,
   d) the membrane of said sensing element is formed by removing the initial substrate.

9. Method according to claim 8, in which said substrate is in silicon.

10. Method according to claim 8, in which the fabrication of said monocrystalline silicon carbide layer comprises:
    transferring a first layer of monocrystalline silicon carbide to the substrate,
    depositing by epitaxy a second layer of monocrystalline silicone carbide on the first layer of monocrystalline silicon carbide in order to obtain said monocrystalline silicon carbide layer of controlled thickness.

11. Method according to claim 8, in which the levelling step is performed by mechanical-chemical polishing.

12. Method according to claim 8, in which the fabrication of said layer of monocrystalline silicon carbide comprises the use of a wafer in monocrystalline silicon carbide in which a layer has been defined by a layer of microcavities generated by ion implantation, said wafer being bonded to the substrate on the side of the levelled layer then cleaved at the layer of microcavities so as only to preserve said defined layer on the substrate.

13. Method according to claim 12, in which cleavage of the wafer is obtained by coalescence of the microcavities resulting from a heat treatment.

14. Method according to claim 12, in which the bonding of said wafer to the substrate is obtained by molecular bonding.

15. Method according to claim 8, further comprising depositing an insulating interface layer on the surface of the substrate containing polycrystalline silicon carbide prior to producing said layer of monopolycrystalline silicon carbide thereon.

16. Method according to claim 8, in which removal of the initial substrate is obtained by the chemical etching.

17. Method according to claim 1, in which before step a) the method comprises the following preliminary steps:
    machining a substrate to obtain a bump of complementary shape to the shape of the desired sensing element as seen from the hostile medium side,
    depositing a layer OF polycrystalline silicon carbide on the substrate on the bumping side,
    levelling the layer previously deposited until the desired thickness of the membrane subsists above the bump, steps a) and d) then being conducted in the following manner:
    a) the layer of monocrystalline silicon carbide is formed on the substrate on the side of the levelled layer, d) the membrane of said sensing elements is formed by removing the initial substrate.

18. Method according to claim 17, in which said substrate is in silicon.

19. Method according to claim 17, in which the levelling step is performed by mechanical-chemical polishing.

20. Method according to claim 17, in which the fabrication of said layer of monocrystalline silicon carbide is obtained using a wafer of monocrystalline silicon carbide in which said layer has been defined by a layer of microcavities generated by ion implantation, said wafer being bonded to this substrate on the side of the levelled layer then cleaved at the layer of microcavities so as only to preserve the layer of monocrystalline silicon carbide on the substrate.

21. Method according to claim 20, in which cleavage of the wafer is obtained by coalescence of the microcavities resulting from a heat treatment.

22. Method according to claim 20, in which the bonding of said wafer to the substance is obtained by molecular bonding.

23. Method according to claim 17, in which removal of the initial substrate is obtained by chemical etching.

24. Method according to claim 17, in which an insulating interface layer is deposited on the levelled layer before the layer of monocrystalline silicon carbide.

25. Method according to claim 17 in which, during the formation of the detection means, the remaining part of the monocrystalline silicon carbide layer is removed.

26. Method according to claim 1, in which the method being a collective manufacturing method for producing sensing elements from one same substrate, a final substrate cutting step is provided to obtain separate sensing elements.

* * * * *